… (United States Patent Office)

3,694,402
Patented Sept. 26, 1972

3,694,402
PROCESS OF INCORPORATING ADDITIVES INTO THERMOPLASTICS
David Maltby Essam, Harrogate, England, assignor to Imperial Chemical Laboratories Limited, London, England
No Drawing. Filed Mar. 3, 1971, Ser. No. 120,694
Claims priority, application Great Britain, Mar. 4, 1970, 10,422/70
Int. Cl. C08g 51/04; C08f 45/04
U.S. Cl. 260—40 R    8 Claims

ABSTRACT OF THE DISCLOSURE

A process is disclosed for the manufacture of extruded articles of a thermoplastic polymer mixed with a minor proportion of solid additive of melting point lower than that of the thermoplastic polymer, wherein the thermoplastic polymer in granular form is continuously fed to a screw extruder, the required proportion of the additive in the form of granules coated with a thermoplastic polymer of melting point at least 30° C. above that of the additive is continuously fed into the stream of granulated thermoplastic polymer, the screw extruder being so designed and so operated as to effect melting and mixing of the thermoplastic polymer and the additive, and the resultant mixture is extruded to form extruded articles.

---

The present invention relates to the manufacture of extruded articles.

According to the present invention we provide a process for the manufacture of extruded articles of a thermoplastic polymer mixed with a minor proportion of solid additive of melting point lower than that of the thermoplastic polymer, wherein the thermoplastic polymer in granular form is continuously fed to a screw extruder, the required proportion of the additive in the form of granules coated with thermoplastic polymer of melting point at least 30° C. above that of the additive is continuously fed into the stream of granulated thermoplastic polymer, the screw extruder being so designed and so operated as to effect melting and mixing of the thermoplastic polymer and the additive, and the resultant mixture is extruded to form extruded articles.

The extruded article may, for example, be filaments, films, rods, tubes or mouldings.

The thermoplastic polymer constituting the major proportion of the extruded articles may be any thermoplastic polymer commonly subjected to the melt extrusion process. Examples of such polymers are polyesters, polyamides, polyolefines and polyvinyl chloride.

The thermoplastic polymer used for coating the granules of additive may most conveniently be the same as that constituting the major proportion of the extruded articles, although it may equally be of the same chemical composition as that of the polymer consituting the major proportion of the extruded articles but of different molecular weight, or even of different chemical composition if the presence of such a second polymer in the product is acceptable. However, the melting point of the second polymer should preferably be not more than 30° C. below that of the polymer constituting the major proportion of the extruded article.

By the term "granular" as it is applied to the thermoplastic polymer, we mean in the form of particles which may, for example, be those in which thermoplastic polymers are commonly formed after manufacture and commonly accepted as suitable for the process of remelting for the process of extrusion. A common size is, for example, one eighth inch cubes or 3 mm. cubes.

In the term "granules" as applied to the additives, we include particles of size sufficiently large for feeding to a screw extruder. We have found most suitable the use of granules of minimum dimension about 3 mm. when coated.

The coated granules of additive may, for example, consist of powdered additive enclosed in a continuous sheath of the thermoplastic polymer, an agglomerate of powdered additive, for example as produced by a tabletting process, and which has been coated with powdered thermoplastic polymer by, for example, tumbling the agglomerate in thermoplastic polymer powder, or an agglomerate consisting of a core of additive powder surrounded by a sheath of thermoplastic polymer powder prepared by known tabletting technique. Preferably the thickness of the coating should be at least 10 thousandths of an inch.

The process of our invention is of particular utility in the manufacture of extruded articles which are coloured, since some of the more desirable shades can be produced only by use of dyestuffs which are of melting point significantly below that of the thermoplastic polymer to be coloured, such dyestuffs at the same time being sufficiently stable to be incorporated by the process involving a screw extruder, but not sufficiently stable to be incorporated by a mass melting method or to be incorporated by charging with the raw materials for manufacture of the polymer. An example of such a thermoplastic polymer is poly(ethylene terephthalate), which is very conveniently coloured by incorporating into it by the process of our invention of disperse dyestuffs, which have at most a melting point of about 180° C., that is about 80° C. below that normally observed for poly(ethylene terephthalate), and which cannot be subjected for more than a few minutes to a temperature in excess of about 200° C. without a significant degree of decomposition taking place.

Attempts to incorporate an additive into a thermoplastic polymer of melting point above that of the additive, using a screw extruder and charging powdered additive along, or using a mixture of powders of additive and thermoplastic polymer, or using tablets of powdered additive alone or tablets of an essentially uniform mixture of powdered additive and powdered thermoplastic polymer were all unsuccessful.

In order that the process of our invention should be the more perfectly understood, we give hereinafter examples of methods in which it may be put into practice. In these examples all parts and percentages are by weight.

Dyestuffs as commonly offered for sale for conventional dyeing normally contain diluent, for example inorganic salts. For the purpose of colouring thermoplastic polymers inorganic salts are normally unacceptable. Thus the dyestuffs referred to in the examples are full strength dyestuffs containing a negligible amount of diluent.

In these examples the granules of additive as charged to the melt-extruder are referred to as tablets in view of their method of preparation. Examples 1, 2 and 5 are for comparison purposes only.

EXAMPLE 1

An intimate mixture was prepared of the two colours 4-[N-($\beta$-cyanoethyl) - N - ($\beta$-acetoxyethyl)amino]-2':6'-dichloro-4'-nitroazobenzene (10.6 parts) and 2-acetylamino-4-[N:N-di($\beta$-acetoxyethyl)amino] - 5 - ethoxy-2'-bromo-4':6'-dinitroazobenzene (1 part). Each of the colours was a high strength colour and each was in the form of particles passing a 20 mesh to the inch sieve and being retained on an 80 mesh to the inch sieve; the particles were agglomerates of much finer particles. The mixture of colours was converted into tablets of three sixteenths of an inch using a conventional tabletting machine.

Melt-spinning was established of poly(ethylene terephthalate) of Intrinsic Viscosity 0.675, as measured in orthochlorophenol at a concentration of 1 g. per 100 ml. at 25° C., in the form of eighth inch cubes and using a 2 inch diameter screw extruder for melting and feeding. The barrel of the extruder and the spinning temperature were maintained within the range 280–290° C. Charging of the tablets of mixed colours was then started at a rate to provide a mixture of poly(ethylene terephthalate) (99 parts) to mixed colour (1 part). After 20 minutes of colour feeding, instability developed in the extruder screw pressure and the pressure then rapidly dropped to zero, accompanied by a loss in feed of polymer chip into the feed section of the screw.

EXAMPLE 2

Example 1 was repeated with the only exception that tablets of mixed colour of five sixteenths of an inch were made and were fed to the screw extruder. After 15 minutes of colour feeding, instability developed in the screw extruder pressure and the pressure then rapidly dropped to zero.

EXAMPLE 3

Five sixteenths inch tablets of mixed colour as described in Example 1 were made by the method described in Example 1. Finely divided poly(ethylene terephthalate) of Intrinsic Viscosity 0.675 passing through 30 mesh to the inch sieve and which had been dried at 185° C. for 4 hours was tumbled with the tablets of mixed colour in the ratio of 1 part of colour to about 8 parts of poly(ethylene terephthalate) in an eccentrically rotating drum for 10 minutes, after which time the tablets had become coated with a layer of poly(ethylene terephthalate), becoming approximate spheres of diameter about three eighths of an inch.

The melt-spinning described in Example 1 was carried out with feeding of the coated colour tablets exactly as in Example 1 and to give the same final composition. After 50 minutes charging of the colour tablets, there was no sign of instability or loss of feed of polymer chip.

EXAMPLE 4

Example 1 was repeated with the exceptions that the barrel and spinning temperature was 275–290° C., one colour was used which was 1:5-dihydroxy-4:8-diamino-2-(4'-acetoxyphenyl) anthraquinone and three sixteenths inch tablets were prepared consisting of a core of colour incorporating 1% of magnesium stearate as lubricant for the tabletting process and a sheath of poly(ethylene terephthalate) of small particle size and mixed with 30% of its weight of microcrystalline cellulose powder to act as binder and 1% stearic acid as lubricant. After 24 minutes feeding of the colour tablets, in proportion to give 1% final content of colour, there was no instability in screw pressure or loss of polymer feed to the extruder inlet pocket.

EXAMPLE 5

Example 4 was repeated with the exception that in place of the colour-containing tablets, the pure colour powder was fed into the feed pocket of the extruder in such proportion as to give 1% final content of colour. After 3½ minutes, there was instability in the extruder pressure and loss of polymer feed to the screw. Feed of colour powder was then stopped, but the re-establishment of polymer chip feed, and hence screw pressure, was very difficult.

Although the examples have been confined to the incorporation of a solid additive which is a colouring material, our invention is concerned with the method of incorporation, and other additives are also appropriate for incorporation, for example antistats, an example of which is poly (alkylene oxide), flame retardants and bacteriostats.

What we claim is:

1. In a process for the manufacture of extruded articles of a thermoplastic polymer mixed with a minor proportion of solid additive of melting point lower than that of the thermoplastic polymer, the steps which comprise continuously feeding a stream of the thermoplastic polymer in granular form to a screw extruder, and continuously feeding the required proportion of the additive in the form of granules coated with a thermoplastic polymer of melting point at least 30° C. above that of the additive into the stream of granulated thermoplastic polymer, the screw extruder being so designed and so operated as to effect melting and mixing of the thermoplastic polymer and the additive, and extruding the resultant mixture to form extruded articles.

2. A process according to claim 1 wherein the thermoplastic polymer with which the additive is coated is of melting point not more than 30° C. below that of the thermoplastic polymer constituting the major proportion of the extruded articles.

3. A process according to claim 1 wherein the thermoplastic polymer with which the additive is coated is the same as that constituting the major proportion of the extruded articles.

4. A process according to claim 1 wherein the additive granules are of minimum dimension about 3 mm. when coated.

5. A process according to claim 1 wherein the additive granules are tablets.

6. A process according to claim 1 wherein the thickness of the coating of the additive granules is at least 10 thousandths of an inch.

7. A process according to claim 1 wherein the thermoplastic polymer constituting the major proportion of the extruded articles is a polyester, a polyamide, a polyolefine or polyvinyl chloride.

8. A process according to claim 1 wherein the additive is a dyestuff.

References Cited

UNITED STATES PATENTS

| | | | |
|---|---|---|---|
| 3,148,412 | 9/1964 | Spreeuwers | 264—211 X |
| 3,455,871 | 7/1969 | Coover et al. | 264—211 UX |
| 3,386,851 | 6/1968 | Harlan | 117—100 B X |
| 3,496,133 | 2/1970 | Hoffman | 264—211 UX |

FOREIGN PATENTS

| | | | |
|---|---|---|---|
| 673,668 | 11/1963 | Canada | 264—211 |
| 596,688 | 1/1948 | Great Britain | 264—211 |

LEWIS T. JACOBS, Primary Examiner

U.S. Cl. X.R.

260—34.2, 37 N, 41 R